United States Patent

Merger et al.

[15] 3,673,258

[45] June 27, 1972

[54] PRODUCTION OF 2,2,4-TRIMETHYL-3-HYDROXYPENTANAL

[72] Inventors: Franz Merger, 8 Homburger Strasse, 6700 Ludwigshafen; Rolf Platz, 5 Hansastrasse, 6800 Mannheim; Erich Nebe, 145 Rohrbacher Strasse, 6900 Heidelberg, all of Germany

[22] Filed: Dec. 27, 1968

[21] Appl. No.: 787,610

[52] U.S. Cl. ....................260/602

[51] Int. Cl. ....................C07c 47/02

[58] Field of Search ....................260/602

[56] References Cited

UNITED STATES PATENTS

| | | | |
|---|---|---|---|
| 3,077,500 | 2/1963 | Heinz et al. | 260/602 X |
| 2,863,878 | 12/1958 | Lynn | 260/602 |

OTHER PUBLICATIONS

Durr, G., Ann. de Chim., Vol. 13, pages 85- 114, 1956.
Hagemeyer et al., " The Chem. of Isobutyraldehyde etc.," 1953, page 17.

*Primary Examiner*—Leon Zitver
*Assistant Examiner*—R. H. Liles
*Attorney*—Marzall, Johnston, Cook & Root

[57] ABSTRACT

Production of 2,2,4-trimethyl-3-hydroxypentanal by dimerization of isobutyraldehyde in the presence of a basic ion exchanger. The product is a valuable intermediate for the production of polyesters and plasticizers.

6 Claims, No Drawings

PRODUCTION OF 2,2,4-TRIMETHYL-3-HYDROXYPENTANAL

The invention relates to the production of 2,2,4-trimethyl-3-hydroxypentanal by dimerization of isobutyraldehyde in the presence of basic ion exchangers.

It is known that isobutyraldehyde can be cyclized in the presence of alkali or amines at from 5° to 10° C to 2,6-diisopropyl-5,5-dimethyl-1,3-dioxanol-(4). The reaction is reversible at 60° to 70° C in the presence of an alkaline catalyst (Hagemeyer, "The Chemistry of Isobutyraldehyde," Tennessee Eastman Company). The said dioxanol derivative can be split up with dilute mineral acid or aliphatic carboxylic acids into isobutyraldehyde and 2,2,4-trimethyl-3-hydroxypentanal (isobutyraldol) (loc. cit.; U.S. Pat. specification No.2,829,169). Distillation of the dioxanol derivative only gives a clear formation of isobutyraldol when acid is added (Ber., 76, 1199 (1943)). An article in Am. Soc., 65, 1716 teaches that the crude product of the action of alkaline solutions on isobutyraldehyde under mild conditions does not contain any aldol but is present in the form of the dioxanol derivative.

It is known from German Pat. printed application No.1,235,883 that isobutyraldehyde and formaldehyde can be reacted at 85° to 100° C in the presence of basic ion exchangers to form 2,2-dimethyl-3-hydroxypropanol. Isobutyraldol is not obtained.

The object of this invention is to produce 2,2,4-trimethyl-3-hydroxypentanal in good yields and high purity by a simple one-stage method.

This and other objects of the invention are achieved and 2,2,4-trimethyl-3-hydroxypentanal is obtained advantageously by dimerizing isobutyraldehyde in the presence of a basic ion exchanger at a temperature of from 35° to 80° C.

The dimerization may be represented by the following equation:

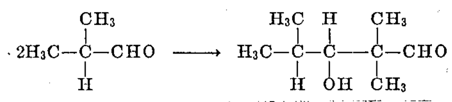

Having regard to the state of the art it is surprising that 2,2,4-trimethyl-3-hydroxypentanal should be obtained in good yields and purity in a simple step. There is no appreciable formation of byproducts, for example 2,6-diisopropyl-5,5-dimethyl-1,3-dioxanol-(4).

Dimerization of the starting material (isobutyraldehyde) is carried out in the presence of ion exchangers having low, medium or preferably high basicity, or mixtures of the same. A number of basic ion exchangers which can be used for the process is given in HoubenWeyl, "Methoden der Organischen Chemie," volume 1/1, page 529, "Anion exchangers." It is preferred to use strongly basic ion exchangers having tetraalkylammonium or trialkylhydroxyalkylammonium groups. It is advantageous to choose an exchanger in the carbonate form or to bring it into this form prior to the reaction, for example by treatment of an exchanger in the chloride form with sodium carbonate solution; the reaction may however be carried out with the hydroxide form of the exchanger. The form and particle size of the exchanger may be chosen at will within a wide range. In batchwise operation, for example in a stirred vessel, the exchanger is generally used in an amount of from 10 to 100 percent, preferably from 25 to 50 percent, by volume with reference to starting material. The process may also be carried out continuously for example by passing isobutyraldehyde through exchanger columns (ratio of length to diameter, for example 10:1) and generally 1 to 10 percent by volume of exchanger is used with reference to the average amount of aldehyde passed through the exchanger per hour. To avoid dehydration and shrinkage of the exchanger resin, particularly in continuous operation, the addition of for example 2 to 10 percent by weight of water with reference to the isobutyraldehyde is occasionally advantageous. The exchanger can be reactivated after the reaction in the usual way, for example by treatment with aqueous sodium carbonate solution followed by rinsing with water, and may be reused in moist or dry condition. The exchangers have a long life; no loss in activity can be detected after reaction lasting 100 hours. Information concerning the production and details regarding use of ion exchangers may be found in the chapter on "Ion exchangers" in volume 1/1 of Houben-Weyl referred to above.

The reaction is carried out at a temperature of from 35° to 80° C, preferably from 50° to 70° C, at atmospheric or superatmospheric pressure. It is advantageous to carry out the reaction in the presence of gases which are inert under the reaction conditions, for example nitrogen, in order to avoid loss in yield and deactivation of the exchanger by oxidation of isobutyraldehyde and isobutyraldol.

The reaction can be carried out as follows: isobutyraldehyde and basic ion exchanger are kept in a stirred vessel under nitrogen at the reaction temperature for from 1 to 20 hours, particularly from 5 to 12 hours. The reaction mixture is then filtered and isobutyraldol is separated from the filtrate by fractional distillation.

The compound which can be prepared by the process according to this invention is a valuable intermediate for the production of 2,2,4-trimethylpentanediol-(1,3) which can be processed into valuable polyesters and plasticizers (see "An Eastman Chemical Product, 2,2,4-trimethyl-1,3-pentanediol, Properties and Applications," 1964, Eastman Kodak Co.)

The invention is illustrated by the following examples. The parts specified in the examples are by weight unless otherwise stated; they bear the same relation to parts by volume as the kilogram to the liter.

EXAMPLE 1

1,000 parts of isobutyraldehyde is stirred in a stirred vessel in the presence of 400 parts by volume of trialkylhydroxyalkylammoniumpolystyrene in the carbonate form for 10 hours under nitrogen and boiled under reflux. The temperature of the reaction mixture rises from 60° to 70° C. The isobutyraldol formed is identified by thin layer chromatography ($R_F$O, 6, silica gel G, benzene/acetone = 90:10). After the exchanger has been filtered off, the mixture is distilled over a fractionation column. 370 parts of unreacted isobutyraldehyde is recovered and 570 parts of isobutyraldol having a boiling point at 12 mm of from 88° to 90° C is obtained. This is equivalent to a yield of 90.5 percent of the theory with reference to reacted isobutyraldehyde.

EXAMPLE 2

1,000 parts of isobutyraldehyde is stirred in the presence of 350 parts by volume of tetraalkylammoniumpolystyrene in the carbonate form in a stirred vessel for 8 hours under nitrogen and boiled under reflux. The temperature of the reaction mixture rises from 60° to 80° C. After the exchanger has been filtered off, the mixture is distilled over a fractionating column and (in addition to 445 parts of isobutyraldehyde) 485 parts of isobutyraldol having a boiling point of from 88° to 90° C at 12 mm is obtained, equivalent to 87.4 percent of the theory with reference to isobutyraldehyde reacted.

We claim:

1. A process for the production of 2,2,4-trimethyl-3-hydroxypentanal which comprises contacting isobutyraldehyde with a basic ion exchanger at a temperature of from 35° to 80° C. and obtaining the 2,2-4-trimethyl-3-hydroxypentanal product by distillation.

2. A process as claimed in claim 1 wherein the isobutyraldehyde is contacted with a strongly basic ion exchanger containing tetraalkylammonium groups.

3. A process as claimed in claim 1 wherein the reaction is carried out batchwise using the exchanger in an amount of from 10 to 100 percent by volume with reference to starting material.

4. A process as claimed in claim 1 wherein the reaction is carried out batchwise in the presence of an exchanger in an amount of from 25 to 50 percent by volume with reference to starting material.

5. A process as claimed in claim 1 wherein the reaction is carried out continuously in the presence of from 1 to 10 percent by volume of exchanger with reference to the average amount of aldehyde passed through the exchanger per hour.

6. A process as claimed in claim 1 wherein the reaction is carried out at a temperature of from 50° to 70° C.

* * * * *

PO-1050
(5/69)

UNITED STATES PATENT OFFICE
CERTIFICATE OF CORRECTION

Patent No. 3,673,258 Dated June 27, 1972

Inventor(s) Franz Merger, Rolf Platz, and Erich Nebe

It is certified that error appears in the above-identified patent and that said Letters Patent are hereby corrected as shown below:

First page, left-hand column, under "Germany" insert
-- [73] Assignee: Badische Anilin- & Soda-Fabrik Aktiengesellschaft, Ludwigshafen/Rhein, Germany --.

First page, left-hand column, under " [21] Appl. No.: 787,610"
insert -- [30] Foreign Application Priority Data
December 29, 1967 Germany.....P 16 43 727.7 --.

Signed and sealed this 19th day of December 1972.

(SEAL)
Attest:

EDWARD M.FLETCHER,JR.
Attesting Officer

ROBERT GOTTSCHALK
Commissioner of Patents